United States Patent
Jayaramachar et al.

(10) Patent No.: US 12,452,341 B2
(45) Date of Patent: Oct. 21, 2025

(54) METHODS, SYSTEMS, AND COMPUTER READABLE MEDIA FOR IMPROVED NETWORK FUNCTION (NF) DISCOVERY BETWEEN FORWARDED AND FORWARDING NF REPOSITORY FUNCTIONS (NRFs) TO AVOID PREEMPTION OF NF PROFILES OF PRODUCER NFs LOCAL TO FORWARDING NRF

(71) Applicant: Oracle International Corporation, Redwood Shores, CA (US)

(72) Inventors: Amarnath Jayaramachar, Bangalore (IN); Yesh Goel, Bangalore (IN); Doki Satish Kumar Patro, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 42 days.

(21) Appl. No.: 18/435,185

(22) Filed: Feb. 7, 2024

(65) Prior Publication Data

US 2025/0254224 A1  Aug. 7, 2025

(51) Int. Cl.
*H04L 67/51* (2022.01)
(52) U.S. Cl.
CPC .................................. *H04L 67/51* (2022.05)
(58) Field of Classification Search
None
See application file for complete search history.

(56) References Cited

U.S. PATENT DOCUMENTS 11,076,281 B1    7/2021  Yau
11,616,711 B1 *  3/2023  Cakulev ............. H04L 41/5058
                                                    709/224

(Continued)

FOREIGN PATENT DOCUMENTS

CN    112584371 B    5/2022
EP    3 716 692 A1   9/2020

(Continued)

OTHER PUBLICATIONS

Notice of Allowance for U.S. Appl. No. 17/468,076 (Jun. 4, 2024).

(Continued)

*Primary Examiner* — Lance Leonard Barry
(74) *Attorney, Agent, or Firm* — Jenkins, Taylor & Hunt, P.A.

(57) ABSTRACT

A method for network function (NF) discovery between forwarded and forwarding NF repository functions (NRFs) includes receiving, at a forwarding NRF, an NF discovery request message generated by a consumer NF or a service communication proxy (SCP), determining, by the forwarding NRF, not to process the NF discovery request message locally and transmitting the NF discovery request message to a forwarded NRF. The forwarded NRF receives the discovery request message, applies empty-list functionality to promote the producer NFs having NF profiles that match query parameters in the NF discovery request message from a SUSPENDED state to a REGISTERED state, and generates and transmits an NF discovery response message and an indication of application if the empty-list functionality to the forwarding NRF. The forwarding NRF applies a local policy to process the indication of application of the empty-list functionality and transmits the NF discovery response to the consumer NF or SCP.

20 Claims, 8 Drawing Sheets

(56) References Cited

U.S. PATENT DOCUMENTS

| | | | |
|---|---|---|---|
| 11,622,276 | B1 | 4/2023 | Wan |
| 11,888,946 | B2 | 1/2024 | Goel |
| 12,127,297 | B2 | 10/2024 | Goel |
| 2021/0083965 | A1* | 3/2021 | Taft ................ H04L 1/0016 |
| 2021/0368427 | A1 | 11/2021 | Rommer et al. |
| 2022/0191294 | A1 | 6/2022 | Yang et al. |
| 2022/0394453 | A1 | 12/2022 | Goel |
| 2022/0394597 | A1 | 12/2022 | Goel |
| 2023/0099468 | A1 | 3/2023 | Khare |

FOREIGN PATENT DOCUMENTS

| | | | | |
|---|---|---|---|---|
| WO | WO 2019/076276 A1 | 4/2019 | | |
| WO | WO 2020/001842 A1 | 1/2020 | | |
| WO | WO 2020/030291 A1 | 2/2020 | | |
| WO | WO 2020/192254 A1 | 10/2020 | | |
| WO | WO 2022/256306 A1 | 12/2022 | | |
| WO | WO 2023/031836 A1 | 3/2023 | | |
| WO | WO-2023198733 A1 * | 10/2023 | ............ | H04W 48/16 |
| WO | WO-2024110068 A1 * | 5/2024 | ......... | H04L 41/0663 |

OTHER PUBLICATIONS

"3rd Generation Partnership Project; Technical Specification Group Core Network and Terminals; 5G System; Network Function Repository Services; Stage 3 (Release 18)", 3GPP TS 29.510, V18.4.0, pp. 1-373 (Sep. 2023).

Non-Final Office Action for U.S. Appl. No. 17/468,076 (Feb. 1, 2024).

Advisory Action/AFCP 2.0 Decision for U.S. Appl. No. 17/468,076 (Jan. 9, 2024).

Applicant-Initiated interview Summary for U.S. Appl. No. 17/468,076 (Jan. 2, 2024).

Final Office Action for U.S. Appl. No. 17/468,076 (Oct. 5, 2023).

Applicant-Initiated Interview Summary for U.S. Appl. No. 17/468,076 (Sep. 22, 2023).

Notice of Allowance and Fee(s) Due for U.S. Appl. No. 17/337,356 (Sep. 14, 2023).

Final Office Action for U.S. Appl. No. 17/337,356 (Jun. 26, 2023).

Examiner-Initiated Interview Summary for U.S. Appl. No. 17/337,356 dated May 2, 2023.

Non-Final Office Action for U.S. Appl. No. 17/468,076 (Apr. 28, 2023).

Non-Final Office Action for U.S. Appl. No. 17/337,356 (Jan. 17, 2023).

Notice of Publication for International Application Serial No. PCT/US2022/031566 (Dec. 8, 2022).

Notification of Transmittal of the International Search Report and the Written Opinion of the International Searching Authority, or the Declaration for International Application No. PCT/US2022/031566 (Sep. 2, 2022).

"3rd Generation Partnership Project; Technical Specification Group Core Network and Terminals; Numbering, addressing and identification; (Release 17)," 3GPP TS 23.003, V17.1.0, pp. 1-143 (Mar. 2021).

"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).

"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).

Vixie et al., "Dynamic Updates in the Domain Name System (DNS Update)," Network Working Group, RFC 2136, pp. 1-26 (Apr. 1997).

* cited by examiner

METHODS, SYSTEMS, AND COMPUTER READABLE MEDIA FOR IMPROVED NETWORK FUNCTION (NF) DISCOVERY BETWEEN FORWARDED AND FORWARDING NF REPOSITORY FUNCTIONS (NRFs) TO AVOID PREEMPTION OF NF PROFILES OF PRODUCER NFs LOCAL TO FORWARDING NRF

TECHNICAL FIELD

The subject matter described herein relates to NF discovery. More particularly, the subject matter described herein relates to improved NF discovery between forwarded and forwarding NRFs to avoid preemption of NF profiles local to a forwarding NRF.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in Third Generation Partnership Project (3GPP) Technical Specification (TS) 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that may occur in 5G and subsequent generation networks relates to NF discovery requests that are forwarded between NRFs, and the NRFs do not share producer NF visibility information. For example, a consumer NF or SCP may generate and send an NF discovery request to a local NRF. The local NRF may be unable to process the NF discovery request, so the local NRF forwards the NF discovery request to an NRF in another region. The NRF that receives an NF discovery request from the consumer NF or SCP and forwards the discovery request to the NRF in the other region is referred to herein as the forwarding NRF. The NRF in the other region that receives the NF discovery request forwarded by another NRF is referred to herein as the forwarded NRF.

In some instances, which will be described herein, the forwarded NRF may return a list of NF profiles in an NF discovery response that preempts NF profiles of producer NFs local to the forwarding NRF. Because the producer NFs registered with the forwarding NRF are typically closer to the consumer NF than the producer NFs local to the forwarded NRF, it may be desirable to implement policies and procedures that favor the producer NFs local to the forwarding NRF. However, the producer NFs whose NF profiles are in the NF discovery response generated by the forwarded NRF preempt or are given preference over those local to the forwarding NRF.

Accordingly, in light of these and other difficulties, there exists a need for improved methods, systems, and computer readable media for NF discovery between forwarding and forwarded NRFs that avoid preemption of NF profiles of producer NFs local to the forwarding NRF.

SUMMARY

A method for NF discovery between forwarded and forwarding NRFs includes receiving, at a forwarding NRF, an NF discovery request message generated by a consumer NF or a service communication proxy (SCP). The method further includes determining, by the forwarding NRF, not to process the NF discovery request message locally at the forwarding NRF and transmitting the NF discovery request message to a forwarded NRF. The method further includes receiving, at the forwarded NRF, the NF discovery request message, and locating NF profiles of producer NFs having attributes that match query parameters in the NF discovery request message. The method further includes determining, by the forwarded NRF, that all of the NF profiles of the producer NFs having attributes that match the query parameters in the NF discovery request message indicate that the producer NFs are in a SUSPENDED state. The method further includes, in response to determining that the NF profiles indicate that the producer NFs are in the SUSPENDED state, applying, by the forwarded NRF, empty-list functionality to promote the producer NFs to a REGISTERED state. The method further includes generating and transmitting, by the forwarded NRF, an NF discovery response message including the NF profiles of the producer NFs promoted to the REGISTERED state, and communicating, to the forwarding NRF, an indication of the application of the empty-list functionality. The method further includes, at the forwarding NRF, receiving the NF discovery response message and the indication of the application of the empty-list functionality, and applying a policy to process the indication of the application of the empty-list functionality.

The method further includes transmitting, by the forwarding NRF, the NF discovery response message to the consumer NF or SCP.

According to another aspect of the subject matter described herein, determining not to process the NF discovery request message locally includes determining that producer NFs local to the forwarding NRF with NF profiles having attributes that match the query parameters in the NF discovery request message are in a SUSPENDED state.

According to another aspect of the subject matter described herein, applying the empty-list functionality includes applying the empty-list functionality on a per-NF-type basis.

According to another aspect of the subject matter described herein, communicating the indication of the application of the empty-list functionality to the forwarding NRF includes adding a header to the NF discovery response message that indicates that the empty-list functionality was applied.

According to another aspect of the subject matter described herein, applying the policy includes ignoring the indication of the application of the empty-list functionality.

According to another aspect of the subject matter described herein, applying the policy includes applying empty-list functionality at the forwarding NRF to promote producer NFs local to the forwarding NRF with NF profiles having attributes that match query parameters in the NF discovery request message from the SUSPENDED state to the REGISTERED state.

According to another aspect of the subject matter described herein, applying the policy includes replacing the NF profiles of the producer NFs included in the NF discovery response message by the forwarded NRF with NF profiles of the producer NFs local to the forwarding NRF having attributes that match the query parameters in the NF discovery request message.

According to another aspect of the subject matter described herein, applying the policy includes adding, by the forwarded NRF and to the NF discovery response message, the NF profiles of the producer NFs local to the forwarding NRF having attributes that match the query parameters in the NF discovery request message.

According to another aspect of the subject matter described herein, applying the policy includes prioritizing the NF profiles of the producer NFs local to the forwarding NRF having attributes that match the query parameters in the NF discovery request message over the NF profiles of the producer NFs included in the NF discovery response message by the forwarded NRF. The method of claim 1 wherein applying the policy includes applying the policy on a per-NF-type basis.

According to another aspect of the subject matter described herein, a system for network function (NF) discovery between forwarded and forwarding NF repository functions (NRFs) includes a first NRF including at least one processor and functioning as a forwarding NRF. The system further includes a second NRF including at least one processor and functioning as a forwarded NRF. The forwarding NRF is configured to receive an NF discovery request message generated by a consumer NF or a service communication proxy (SCP), determine not to process the NF discovery request message locally at the forwarding NRF, and transmit the NF discovery request message to the forwarded NRF. The forwarded NRF is configured to receive the NF discovery request message, locate NF profiles of producer NFs having attributes that match query parameters in the NF discovery request message, determine that all of the NF profiles of the producer NFs having attributes that match the query parameters in the NF discovery request message indicate that the producer NFs are in a SUSPENDED state, in response to determining that the NF profiles indicate that the producer NFs are in the SUSPENDED state, apply empty-list functionality to promote the producer NFs to a REGISTERED state, and generate and transmit an NF discovery response message including the NF profiles of the producer NFs promoted to the REGISTERED state, and communicate, to the forwarding NRF, an indication of the application of the empty-list functionality. The forwarding NRF is configured to receive the NF discovery response message and the indication of the application of the empty-list functionality, apply a policy to process the indication of the application of the empty-list functionality, and transmit the NF discovery response message to the consumer NF or SCP.

According to another aspect of the subject matter described herein, in determining not to process the NF discovery request message locally, the forwarding NRF is configured to determine that producer NFs local to the forwarding NRF with NF profiles having attributes that match the query parameters in the NF discovery request message are in a SUSPENDED state.

According to another aspect of the subject matter described herein, the forwarded NRF is configured to apply the empty-list functionality on a per-NF-type basis.

According to another aspect of the subject matter described herein, the forwarded NRF is configured to communicate the indication of the application of the empty-list functionality to the forwarding NRF by adding a header to the NF discovery response message that indicates that the empty-list functionality was applied.

According to another aspect of the subject matter described herein, in applying the policy, the forwarding NRF is configured to ignore the indication of the application of the empty-list functionality.

According to another aspect of the subject matter described herein, in applying the policy, the forwarding NRF is configured to apply empty-list functionality to promote producer NFs local to the forwarding NRF with NF profiles having attributes that match query parameters in the NF discovery request message from the SUSPENDED state to the REGISTERED state. The system of claim 16 wherein, in applying the policy, the forwarding NRF is configured to replace the NF profiles of the producer NFs included in the NF discovery response message by the forwarded NRF with NF profiles of the producer NFs local to the forwarding NRF having attributes that match the query parameters in the NF discovery request message.

According to another aspect of the subject matter described herein, in applying the policy, the forwarding NRF is configured to add, to the NF discovery response message, the NF profiles of the producer NFs local to the forwarding NRF having attributes that match the query parameters in the NF discovery request message and prioritize the NF profiles of the producer NFs local to the forwarding NRF having attributes that match the query parameters in the NF discovery request message over the NF profiles of the producer NFs included in the NF discovery response message by the forwarded NRF.

According to another aspect of the subject matter described herein, the forwarding NRF is configured to apply the policy on a per-NF-type basis.

According to another aspect of the subject matter described herein, one or more non-transitory computer readable media having stored thereon executable instructions that when executed by processors of one or more computers control the one or more computers to perform steps are provided. The steps include receiving, at a forwarding network function (NF) repository function (NRF), an NF discovery request message generated by a consumer NF or a service communication proxy (SCP). The steps further include determining, by the forwarding NRF, not to process the NF discovery request message locally at the forwarding NRF and transmitting the NF discovery request message to a forwarded NRF. The steps further include receiving, at the forwarded NRF, the NF discovery request message, and locating NF profiles of producer NFs having attributes that match query parameters in the NF discovery request message. The steps further include determining, by the forwarded NRF, that all of the NF profiles of the producer NFs having attributes that match the query parameters in the NF discovery request message indicate that the producer NFs are in a SUSPENDED state. The steps further include, in response to determining that the NF profiles indicate that the producer NFs are in the SUSPENDED state, applying, by the forwarded NRF, empty-list functionality to promote the producer NFs to a REGISTERED state. The steps further include generating and transmitting, by the forwarded NRF, an NF discovery response message including the NF profiles of the producer NFs promoted to the REGISTERED state, and communicating, to the forwarding NRF, an indication of the application of the empty-list functionality. The steps further include, at the forwarding NRF, receiving the NF discovery response message and the indication of the application of the empty-list functionality, and applying a policy to process the indication of the application of the empty-list functionality. The steps further include transmitting, by the forwarding NRF, the NF discovery response message to the consumer NF or SCP.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
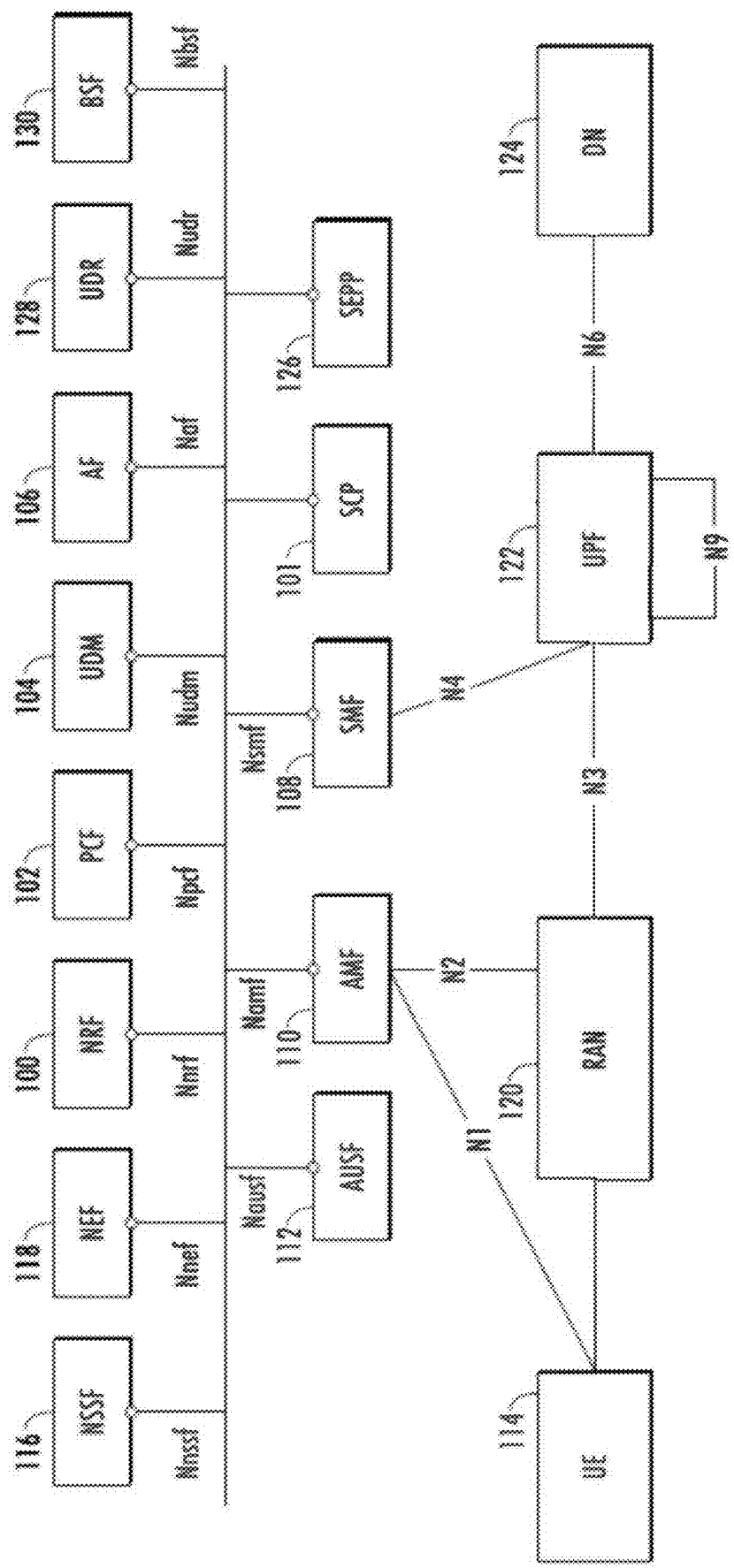
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gnodeB (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A security edge protection proxy (SEPP) 126 filters incoming traffic from another public land mobile network (PLMN) and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between packet data unit (PDU) sessions and PCFs.

As stated above, one problem that can occur in 5G and subsequent generation networks is preemption of NF profiles in an NF discovery response from the forwarded NRF to the forwarding NRF. For example, the forwarding NRF may receive an NF discovery request from a local consumer NF or a local SCP. The forwarding NRF may not be able to process the NF discovery request, for example, because the all of the producer NFs whose NF profiles satisfy the search criteria are currently in a SUSPENDED state. In such a case, the forwarding NRF may forward the NF discovery request to the forwarded NRF.

The forwarded NRF may perform a lookup in its NF profiles database using the query parameters in the NF discovery request and locate one or more NF profiles having attributes that match the query parameters. In this example, it is also assumed that all of the NF profiles having attributes that match the query parameters indicate that the corresponding producer NFs are in a SUSPENDED state, e.g., because of temporary network unavailability. In such a case, rather than returning an empty list of NF profiles, the forwarded NRF may apply a functionality referred to herein as empty-list processing, which includes promoting the NF profiles that match the query parameters but that are in a SUSPENDED state to a REGISTERED state. The reason for promoting the producer NFs to the REGISTERED state is to avoid sending an empty list of NF profiles to the query originator when the producer NFs may be operational but temporarily unreachable due to a transient network event.

The forwarded NRF formulates and sends an NF discovery response to the forwarding NRF where the NF discovery response includes the NF profiles that have been promoted to the REGISTERED state. The forwarding NRF receives the NF discovery response and forwards the NF discovery response to the consumer NF or SCP without determining whether any producer NFs local to the forwarding NRF are available and match the query parameters in the NF discovery request. In this example, the NF profiles included in the NF discovery response by the forwarded NRF using the empty-list functionality preempt the NF profiles of producer NFs local to the forwarding NRF. Because the producer NFs local to the forwarding NRF may be closer to and/or better suited to provide service to the consumer NF, it is undesirable to allow the NF profiles included in the NF discovery response by the forwarded NRF to preempt the NF profiles of the local producer NFs. The subject matter described herein provides a solution that can avoid this difficulty.

According to one aspect of the subject matter described herein, the forwarded NRF communicates to the forwarding NRF an indication that the empty-list functionality has been applied by the forwarded NRF in producing the NF discovery response. In one example, the indication is provided in a custom header referred to as "OC-empty-list-applied", which is included in the NF discovery response. A new set of configurations or policies is introduced in the forwarding NRF to consume and process the header received in the NF discovery response. The policies can be configured at the forwarding NRF to ignore the indication, to replace the NF profiles in the NF discovery response with NF profiles from the forwarding NRF, or to prepend the NF profiles from the forwarding NRF to the NF discovery response. The priority attribute values of the NF profiles prepended to the NF discovery response may be set to give preference to the producer NFs local to the forwarding NRF. With this solution, even when the empty-list functionality is applied, the NF producers closer to the NF consumer are given preference in the NF discovery response, where the preference may be based on locality and/or latency.

Figure 2:
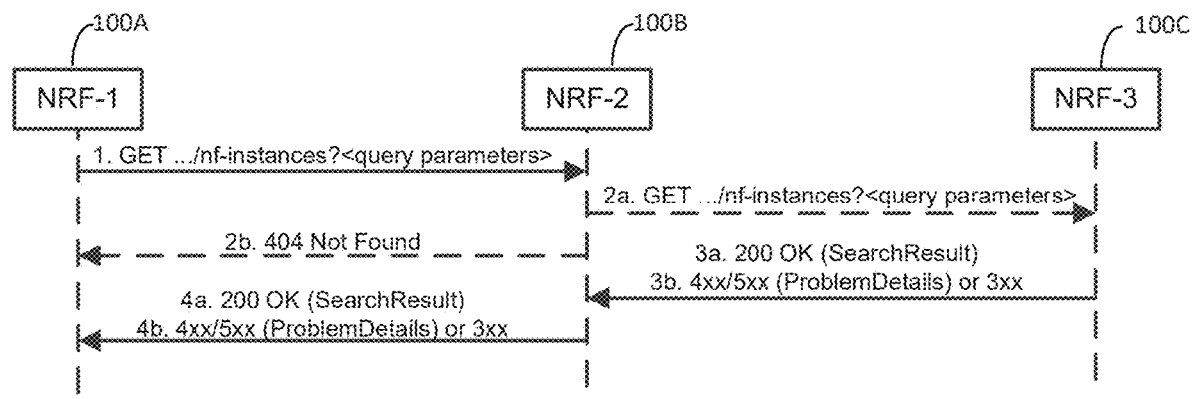
FIG. 2 is a message flow diagram illustrating service discovery with an intermediate forwarding NRF.

FIG. 2 is a message flow diagram illustrating service discovery with an intermediate forwarding NRF. Referring to FIG. 2, it is assumed that NRF-1 100A receives an NF discovery request message. NRF-1 100A does not have sufficient information as determined by network operator policy to process the NF discovery request message locally. Accordingly, in step 1, NFR-1 100A forwards the NF discovery request to NRF-2 100B.

If NRF-2 100B also does not have sufficient information to process the NF discovery request message, NRF-2 100B forwards the NF discovery request message to NRF-3 100C, as indicated by step 2*a*. NRF-2 100B also responds to NRF-1 100A in step 2*b* with a 404 Not Found message. NRF-3 100C processes the NF discovery request locally and returns, to NRF-2 100B, the NF profiles of producer NFs that are local to NRF-3 100C, as indicated by step 3*a* or responds with a 4 xx or 5 xx message indicating problem details or a 3 xx message indicating that the NF discovery request has been forwarded (step 3*b*). NRF-2 100B forwards the NF discovery response received from NRF-3 100C to NRF-1 100A, as indicated by step 4*a* or 4*b*.

Figure 3:
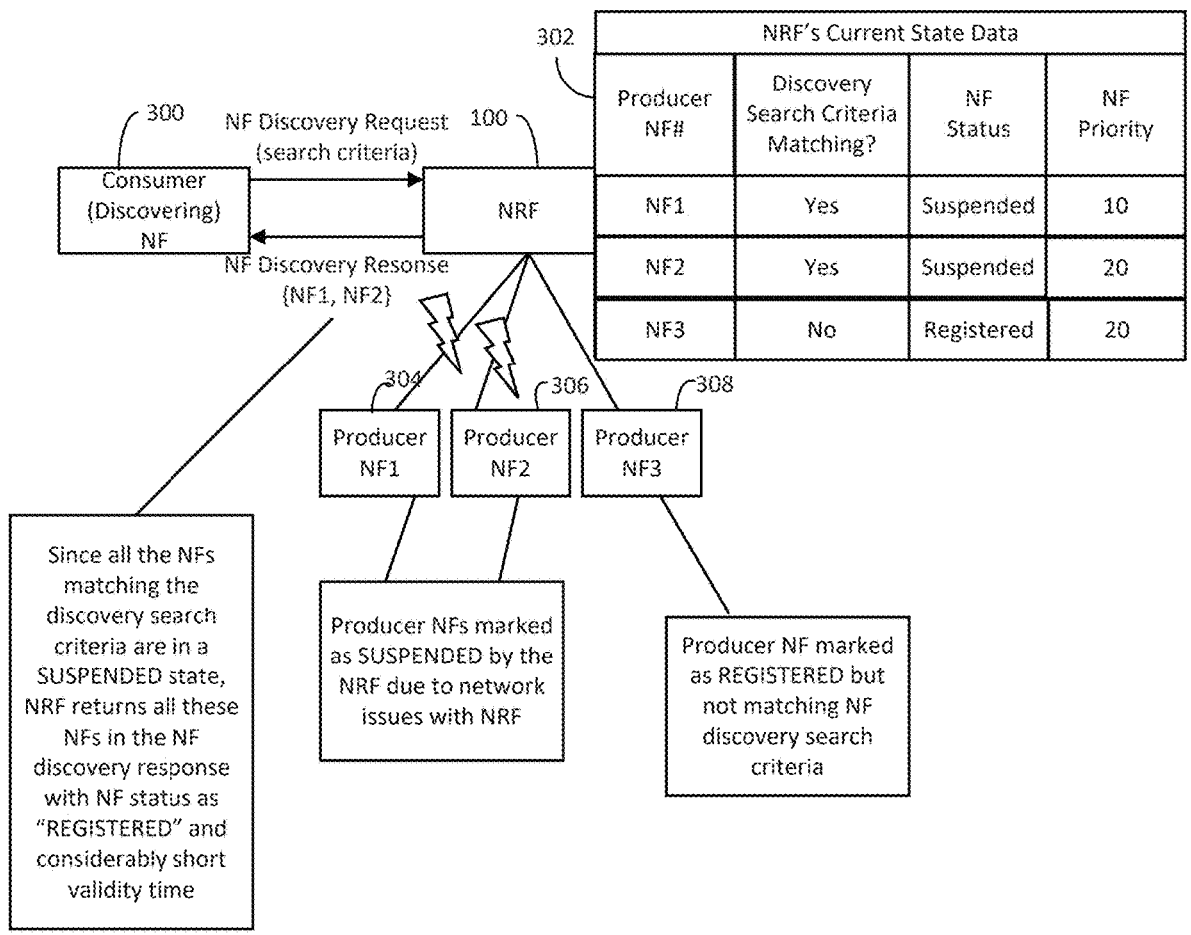
FIG. 3 is a network diagram illustrating the application of empty-list functionality to promote producer NFs whose NF profiles match query parameters in an NF discovery request from a SUSPENDED state to a REGISTERED state.

FIG. 3 is a network diagram illustrating the application of empty-list functionality to promote producer NFs whose NF profiles match query parameters in an NF discovery request from a SUSPENDED state to a REGISTERED state. Referring to FIG. 3, a consumer NF 300 sends an NF discovery request to NRF 100. Table 302 illustrates the current state data maintained by NRF 100. According to the state data, producer NF 304 and producer NF 306 have NF profiles with attributes that match the query parameters in the NF discovery request. However, producer NF 304 and producer NF 306 are both in the SUSPENDED state, for example, due to network communications problems between producer NFs 304 and 306 and NRF 100. Producer NF 308 is in the REGISTERED state, but producer NF 308 does not have an NF profile with attributes that matches the query parameters in the NF discovery request message.

According to 3GPP TS 29.510, an NRF changes the status of a producer NF to the SUSPENDED state when the producer NF does not respond to an NF heart-beat request within a configurable timeout period. Also, the NRF does not consider a producer NF as discoverable when the NF profile indicates that the producer NF is in the SUSPENDED state, and, therefore, according to 3GPP TS 29.510, the NRF does not include the NF profiles of producer NFs that are in a SUSPENDED state in an NF discovery response.

In the example in FIG. 3, all of the producer NFs whose NF profiles match the query parameters in the NF discovery request are in the SUSPENDED state, so the standard behavior of the NRF would be to send a discovery response and not include the NF profiles of producer NF-1 304 or producer NF-2 306 in the NF discovery response. However, rather than returning an NF discovery response with no NF profiles, NRF 100 applies empty-list functionality, which includes promoting the status of producer NFs 304 and 306 from the SUSPENDED state to the REGISTERED state, inserting an attribute indicating a shortened validity time period in the NF profiles, and returning the NF profiles of producer NFs 304 and 306 in the NF discovery response. The shortened validity time period decreases the time for the consumer NF to reattempt NF discovery to determine whether the producer NFs have become available or are no longer registered with NRF 100. Consumer NF 300 receives the NF discovery response and selects one of producer NFs 304 and 306 to provide the service indicated by the query parameters in the NF discovery request.

The empty-list functionality illustrated in FIG. 3 may be selectively enabled or disabled by the network operator. In addition, the network operator can configure the validity time for the NF profiles for which the empty-list functionality is applied. The empty-list functionality may also be enabled on a per-target-NF-type basis.

Figure 4:
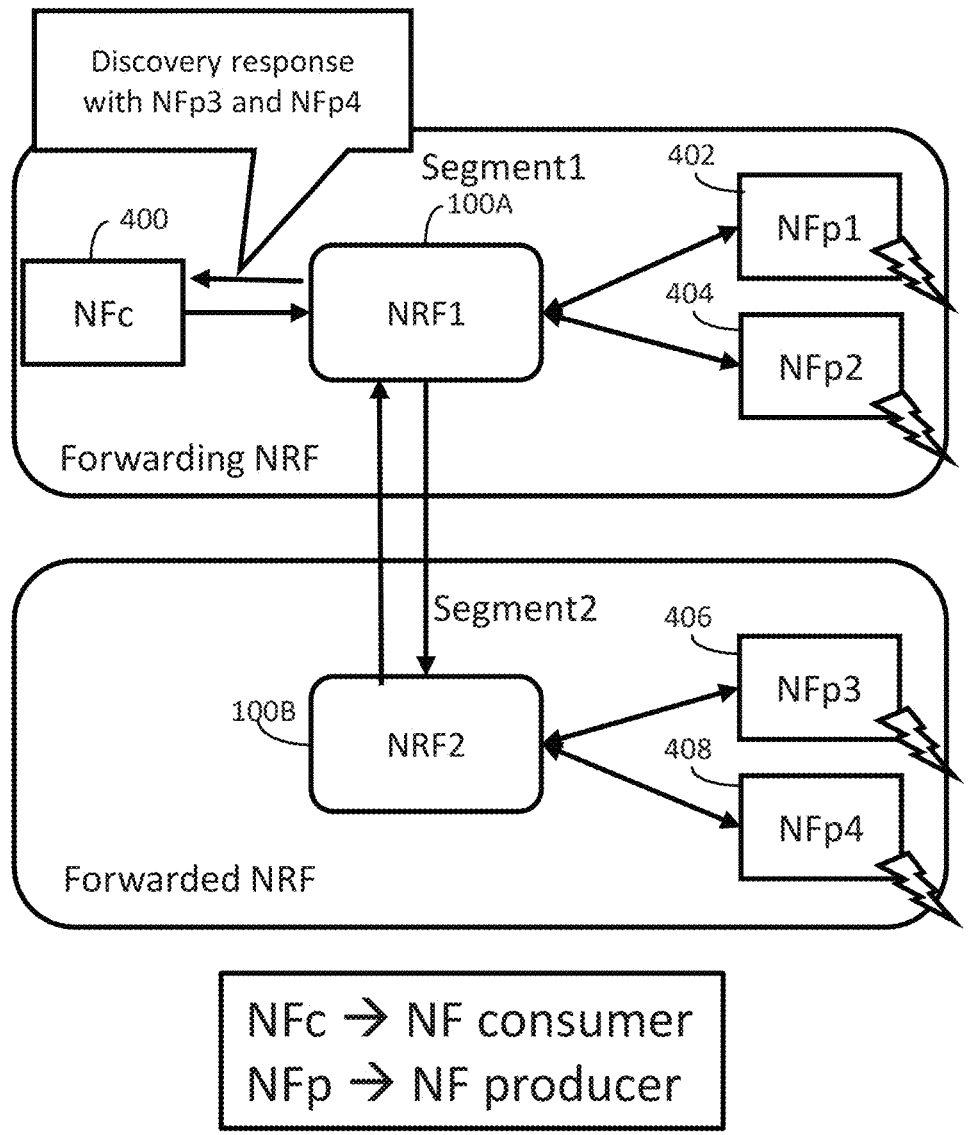
FIG. 4 is a network diagram illustrating a problem that can occur when empty-list functionality is applied by a forwarded NRF in an NRF forwarding scenario.

FIG. 4 is a network diagram illustrating a problem that can occur when empty-list functionality is applied by a forwarded NRF in an NRF forwarding scenario. In FIG. 4, NRF-1 100A and NRF-2 100B are two different NRFs that serve two different segments of a region. In this example, it is assumed that state data is not shared between NRF-1 100A and NRF-2 100B.

NFc 400 generates and sends an NF discovery request to NRF-1 100. The NF profiles of producer NFs NFp1 402 and NFp2 404 have attributes that match the discovery criteria and are visible by NRF-1 100A, and the NF profiles of producer NFs NFp3 406 and NFp4 408 have attributes that match to the discovery criteria and are visible by NRF-2 100B. NRF-1 100A is only aware of the NF profiles of NFp1 402 and NFp2 404. In this case, both NFp1 402 and NFp2 404 are in the SUSPENDED state. Hence, based on network operator policy, NRF-1 100A forwards the NF discovery request to a pre-configured destination, which in this case is NRF-2 100B.

NRF-2 100B is only aware of NFp3 406 and NFp4 408. Both producer NFs NFp3 406 and NFp4 408 are in the SUSPENDED state. NRF-2 100B applies the empty-list functionality, thereby promoting producer NFs NFp3 406 and NFp4 408 to the REGISTERED state, formulates an NF discovery response, includes the NF profiles of producer NFs NFp3 406 and NFp4 408 in the NF discovery response, and transmits the NF discovery response to NRF-1 100A.

NRF-1 100A receives the NF discovery response and forwards the NF discovery response to consumer NF NFc 400 without considering whether producer NFs NFp1 402 or NFp2 404 might be better suited to provide service to consumer NF NFc 400.

One problem with this scenario is that the empty-list feature is applied by the forwarded NRF, and the application by the forwarded NRF precludes or preempts the application of the empty-list functionality by the forwarding NRF. Since NFc 400 is local to NRF-1 100A, the NF producers local to NRF-1 that match the query parameters should be considered over the producer NFs local to producer NRF NRF-2 100B due to locality and latency. Hence, in this scenario, the empty-list functionality should be applied by NRF-1 where the NFp1 402 and NFp2 404 are promoted to the REGISTERED state and included in the NF discovery response to enable NF consumers to choose the local NF producers.

Figure 5:
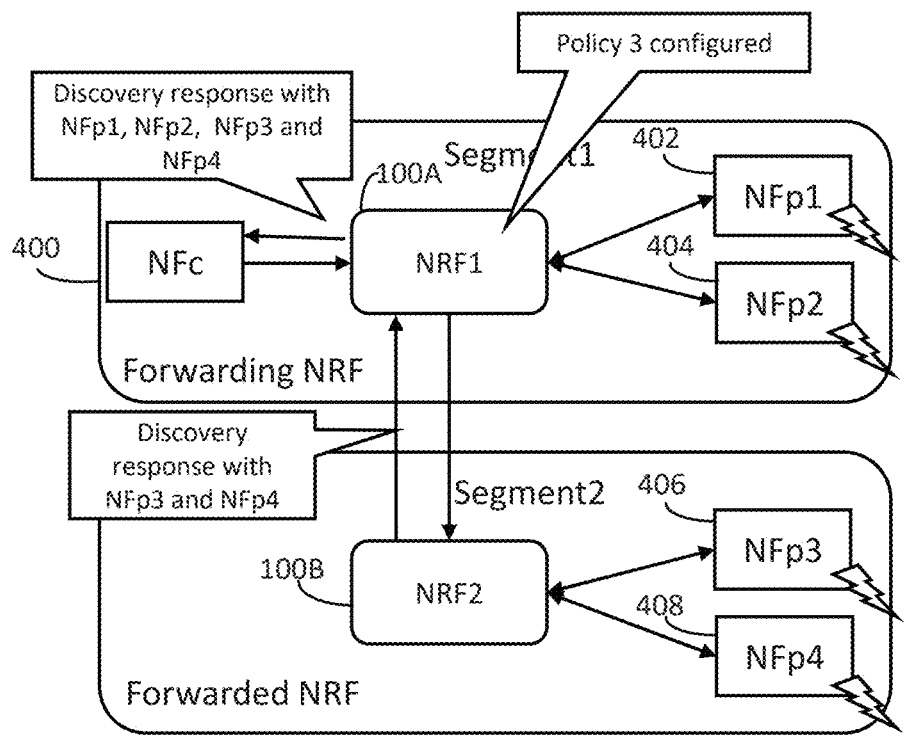
FIG. 5 is a network diagram illustrating exemplary communication by a forwarded NRF to a forwarding NRF of an indication that empty-list functionality has been applied and of application of policies by the forwarding NRF in response to receiving the notification of application of empty-list functionality by the forwarded NRF.

FIG. 5 is a network diagram illustrating exemplary communication by a forwarded NRF to a forwarding NRF of an indication that empty-list functionality has been applied and of the application of policies by the forwarding NRF in response to receiving the notification of application of empty-list functionality by the forwarded NRF. The forwarded NRF includes the notification that empty-list functionality has been applied in a custom header added to the NF discovery response. A new configuration is introduced in the forwarding NRF to consume and process the header received in the NF discovery response. In one example, the configurations can be policies. Example policies that may be applied by the forwarding NRF are as follows:

Policy1→ignore the header;

Policy2→apply empty-list processing and replace the NF profiles of the NFps from the forwarded NRF; and Policy3→apply empty-list processing and prepend the NF profiles of NFps from the forwarding NRF and adjust priority attribute values to favor or prefer producer NFs local to the forwarding NRF over the producer NFs local to the forwarded NRF.

Policies can also be configured on a per-NF-type basis.

In FIG. 5, consumer NF NFc 400 sends an NF discovery request to NRF-1 100A. NRF-1 100A determines that both producer NFs NFp1 402 and NFp2 404 have NF profiles with attributes that match the query parameters in the NF discovery request. NRF-1 100A also determines that producer NF NFp1 402 and NFp2 404 are currently in the SUSPENDED state. Based on local policy, NRF-1 100A forwards the NF discovery request to NRF-2 100B. NRF-2 100B receives the NF discovery request, determines that producer NFs NFp3 406 and NFp4 408 have NF profiles with attributes that match the query parameters in the NF discovery request, determines that producer NFs NFp3 406 and NFp4 408 are in the SUSPENDED state, and applies empty-list processing to promote producers NF NFp3 406 and NFp4 408 to the REGISTERED state. NRF-2 100B includes the NF profiles of producer NF NFp3 406 and NFp4 408 in an NF discovery response. NRF-2 100B also includes the OC-empty-list-applied header to the NF discovery response. NRF-2 100B forwards the NF discovery response to NRF-1 100A.

NRF-1 100A receives the NF discovery response, reads the OC-empty-list-applied header, and applies a local policy to determine how to process the OC-empty-list-applied header. In this example, NRF-1 100A applies policy3 described above in which empty-list functionality is applied and, as a result, the NF profiles of producer NFs NFp1 402 and NFp2 404 are added to the NF discovery response. The priority attributes in the NF profiles of NFp1 402 and NFp2

404 are modified relative to the priority attributes of the NF profiles of producer NFs NFp3 406 and NFp4 408 to make producer NFs NFp1 402 and NFp2 404 more preferred than producer NFs NFp3 406 and NFp4 408. NRF-1 100A forwards the NF discovery response to consumer NF NFc 400. Consumer NF NFc 400 selects from the NF profiles of NFp1 402, NFp2 404, NFp3 406, and NFp4 408 to process a subsequent service-based interface (SBI) request. Because the NF profiles of NFp1 402 and NFp2 404 indicate that producer NFs NFp1 402 and NFp2 404 are more preferred, consumer NF NFc 400 is more likely to select NFp1 402 or NFp2 404 over NFp3 406 and NFp4 408.

Figure 6:
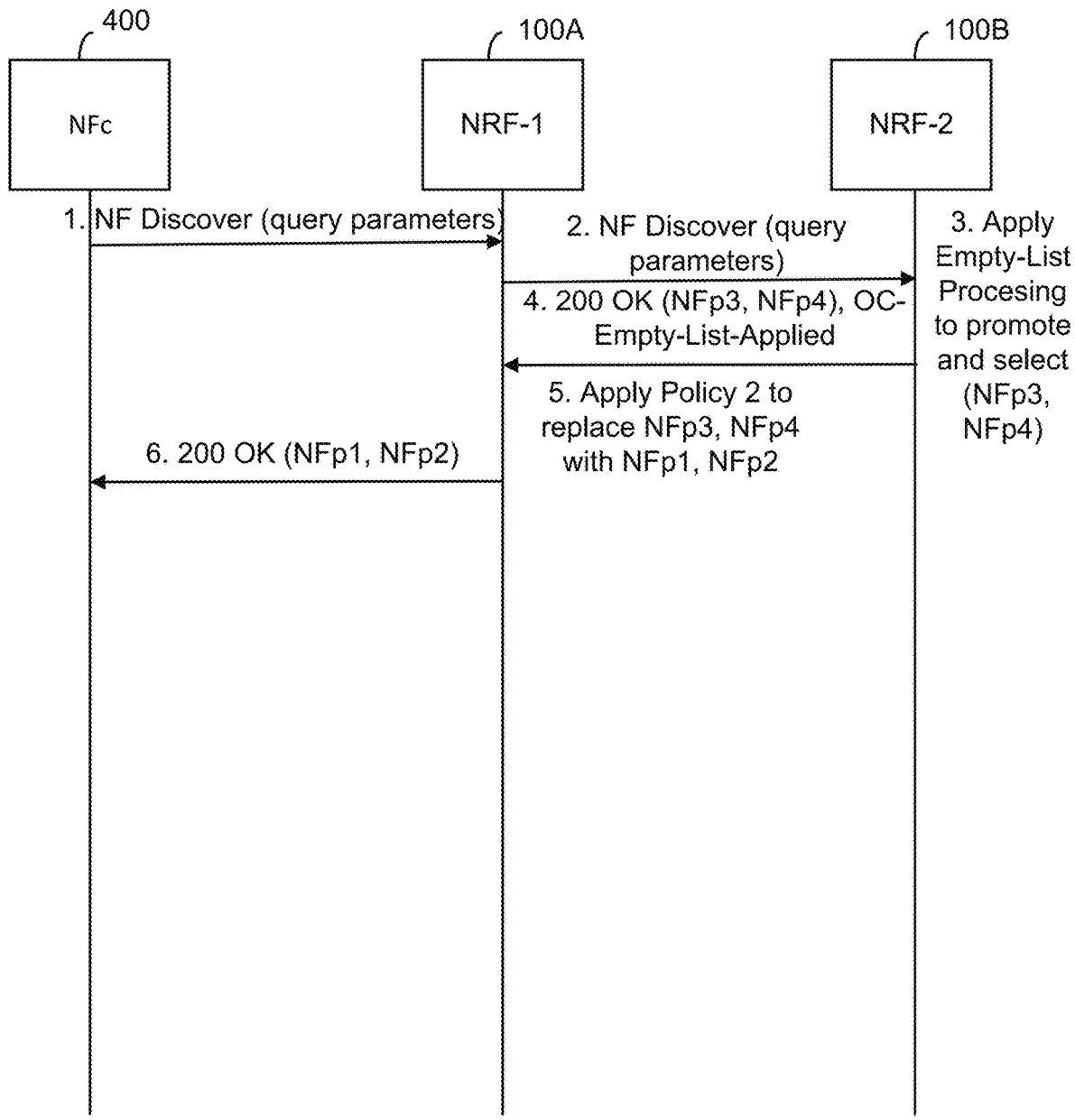
FIG. 6 is a message flow diagram illustrating exemplary messages exchanged for NRF forwarding where the forwarded NRF applies empty-list processing and adds an OC-empty-list-applied header to the NF discovery response, and the forwarding NRF applies a local policy to process the OC-empty-list-applied header.

FIG. 6 is a message flow diagram illustrating exemplary messages exchanged for NRF forwarding where the forwarded NRF applies empty-list processing and adds the OC-empty-list-applied header to the NF discovery response, and the forwarding NRF applies policy2 to process the OC-empty-list-applied header. Referring to FIG. 6, in step 1, NFc 400 sends an NF discovery request to NRF-1 100A. In step 2, NRF-1 100A determines that the NF profiles of producer NFs NFp1 402 and NFp2 404 include attributes that match the query parameters in the NF discovery request, NFp1 402 and NFp1 404 are in the SUSPENDED state, and NFp1 402 and NFp2 404 are the only producer NFs local to NRF-1 100A that match the query parameters. Accordingly, based on a local policy implemented by NRF-1 100A, NRF-1 100A forwards the NF discovery request to NRF-2 100B.

In step 3, NRF-2 100B receives the NF discovery request and determines that the NF profiles of NFp3 406 and NFp4 408 include attributes that match the query parameters in the NF discovery request. NRF-2 100B also determines that producer NFs NFp3 406 and NFp4 408 are currently in the SUSPENDED state and applies empty-list processing to promote NFp3 406 NFp4 408 to the REGISTERED state and generate an NF discovery response including the NF profiles of NFp3 406 and NFp4 408. NRF-2 100B adds the OC-empty-list-applied header to the NF discovery response. In step 4, NRF-2 100B forwards the NF discovery response including the OC-empty-list-applied header to NRF-1 100A.

In step 5, NRF-1 100A receives the NF discovery response including the OC-empty-list-applied header and performs empty-list processing to promote NFp1 402 and NFp2 404 to the REGISTERED state. NRF-1 100A applies policy2 to replace the NF profiles of NFp3 406 and NFp4 408 in the NF discovery response with the NF profiles of NFp1 402 and NFp2 404. In step 6, NRF-1 100A forwards the NF discovery response with the NF profiles of NFp1 402 and NFp2 404 to consumer NF NFc 400.

Figure 7:
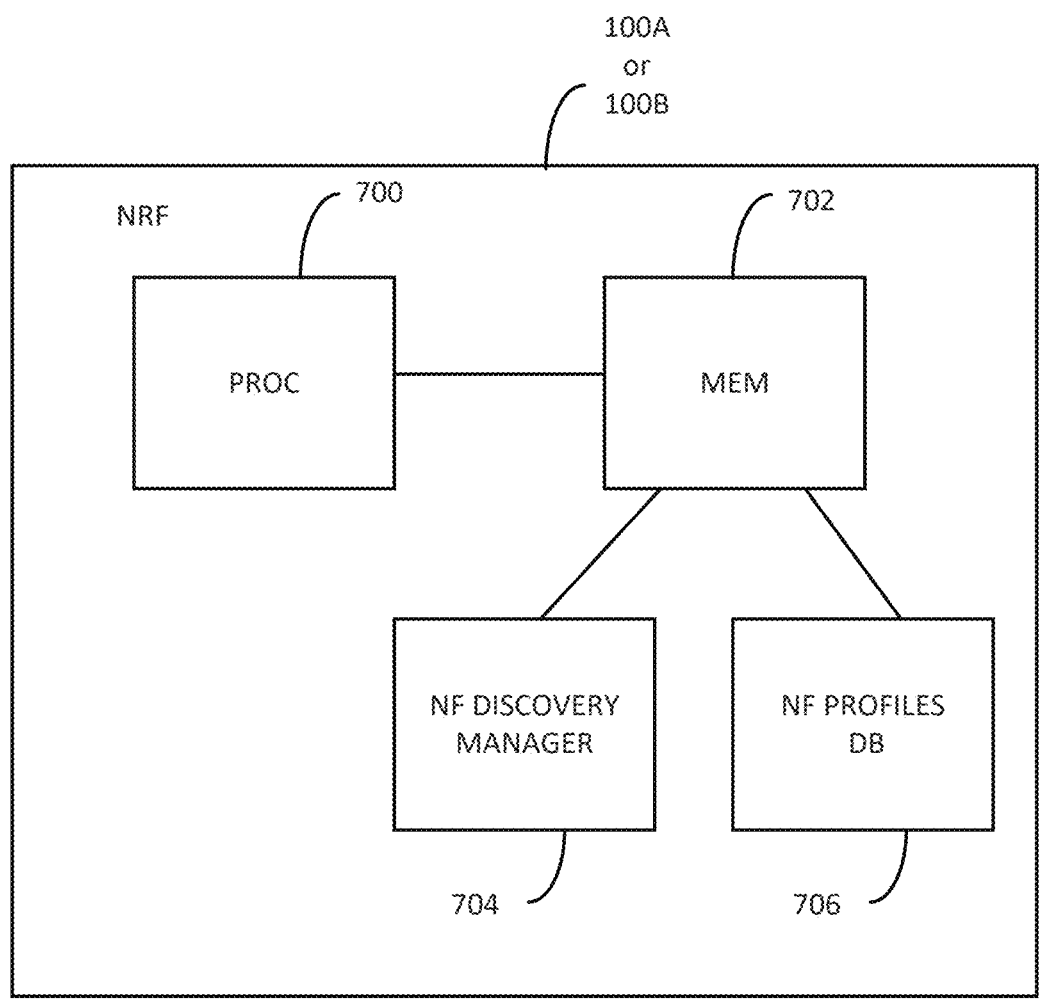
FIG. 7 is a block diagram illustrating an exemplary architecture of an NRF for performing NF discovery with NRF forwarding and empty-list processing in a manner that avoids preemption of NF profiles local to the forwarding NRF.

FIG. 7 is a block diagram illustrating an exemplary architecture of a an NRF for performing NF discovery with NRF forwarding and empty-list processing in a manner that avoids preemption of NF profiles local to the forwarding NRF. Referring to FIG. 7, NRF 100A or 100B may function as a forwarded or a forwarding NRF depending on whether NRF 100A or 100B is forwarding an NF discovery request or processing an NF discovery request forwarded by another NRF. NRF 100A or 100B includes at least one processor 700 and a memory 702. NRF 100A or 100B includes an NF discovery manager 704 that processes NF discovery requests using NF profiles stored in NF profiles database 706. NF discovery manager 704 may also perform NRF forwarding and apply empty-list processing. NF discovery manager 704 may apply local policies to process indications of empty-list processing received from other NRFs. NF discovery manager 704 may insert an indication of application of empty-list processing in an NF discovery response when NRF 100A or 100B applies empty-list processing and forwards an NF discovery response to another NRF. NF discovery manager 704 may be implemented using computer executable instructions stored in memory 702 and executed by processor 700.

Figure 8:
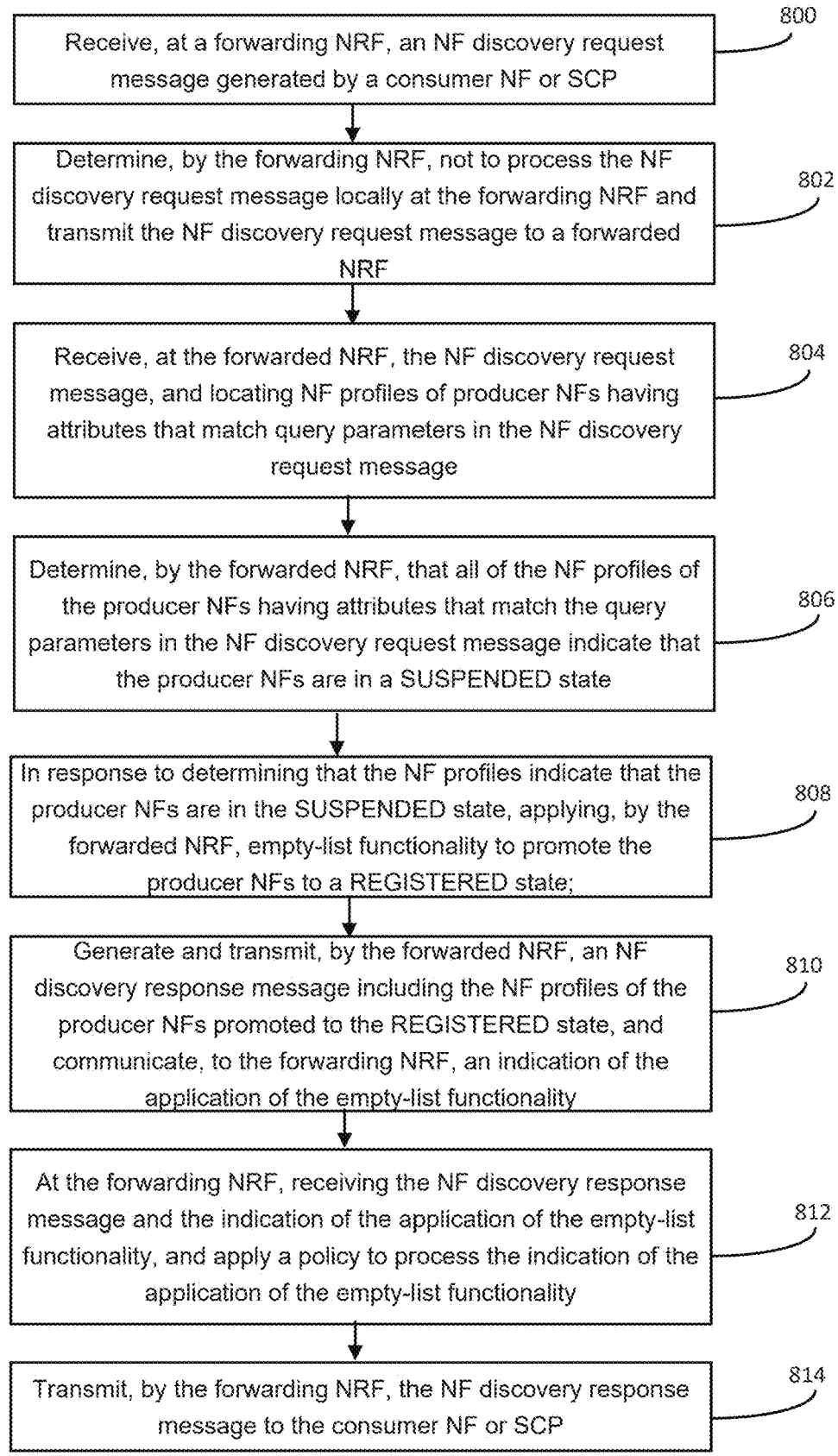
FIG. 8 is a flow chart illustrating an process for performing NF discovery with NRF forwarding and empty-list processing in a manner that avoids preemption of NF profiles local to the forwarding NRF.

FIG. 8 is a flow chart illustrating an exemplary process for performing NF discovery with NRF forwarding and empty-list processing in a manner that avoids preemption of NF profiles local to the forwarding NRF. Referring to FIG. 8, in step 800, the process includes receiving, at a forwarding NRF, an NF discovery request message generated by a consumer NF or a service communication proxy (SCP). For example, an NRF, such as forwarding NRF-1 100A, may receive an NF discovery request from a consumer NF or an SCP.

In step 802, the process further includes determining, by the forwarding NRF, not to process the NF discovery request message locally at the forwarding NRF and transmitting the NF discovery request message to a forwarded NRF. For example, forwarding NRF 100A may perform a lookup in its NF profiles database using query parameters in the NF discovery response, locate one or more NF profiles having attributes that match the query parameters, and determine that all of the NF profiles having attributes that match the query parameters are in a SUSPENDED state. Based on a local policy, forwarding NRF 100A may determine to forward the NF discovery request to forwarded NRF 100B.

In step 804, the process further includes receiving, at the forwarded NRF, the NF discovery request message, and locating NF profiles of producer NFs having attributes that match query parameters in the NF discovery request message. For example, forwarded NRF 100B may perform a lookup in its NF profiles database and locate one or more NF profiles of producer NFs local to forwarded NRF 100B that have attributes that match the query parameters in the NF discovery request.

In step 806, the process further includes determining, by the forwarded NRF, that all of the NF profiles of the producer NFs having attributes that match the query parameters in the NF discovery request message indicate that the producer NFs are in a SUSPENDED state. For example, forwarded NRF 100B may determine that the NF profiles located in step 804 indicate that the producer NFs are in a SUSPENDED state.

In step 808, the process further includes, in response to determining that the NF profiles indicate that the producer NFs are in the SUSPENDED state, applying, by the forwarded NRF, empty-list functionality to promote the producer NFs to a REGISTERED state. For example, forwarded NRF 100B may change the value of the nfStatus attribute from SUSPENDED to REGISTERED in each of the NF profiles of the producer NFs having attributes that match the query parameters in the NF discovery request. Forwarded NRF 100B may also communicate in the NF discovery response a validity period that is shorter than a validity period for non-promoted NRFs to trigger the consumer NF or SCP to initiate a new NF discovery request sooner than for non-promoted NFs to refresh NF discovery results.

In step 810, the process further includes generating and transmitting, by the forwarded NRF, an NF discovery response message including the NF profiles of the producer NFs promoted to the REGISTERED state, and communicating, to the forwarding NRF, an indication of the application of the empty-list functionality. For example, forwarded NRF-2 100B may generate the and transmit the NF discovery response including the NF profiles of the promoted producer NFs and the OC-empty-list-applied header.

In step 812, the process further includes, at the forwarding NRF, receiving the NF discovery response message and the indication of the application of the empty-list functionality, and applying a policy to process the indication of the application of the empty-list functionality. For example, forwarding NRF-1 100A may receive the NF discovery response, read the OC-empty-list-applied header, and apply one of the policies described above the process the NF discovery request in light of the header.

In step 814, the process further includes transmitting, by the forwarding NRF, the NF discovery response message to the consumer NF or SCP. For example, forwarding NRF-1 100A may forward the NF discovery response to the consumer NF or SCP. The content of the NF discovery response will depend on the policy applied in step 812.

Exemplary advantages of the subject matter described herein include the ability of NF consumers to discover NF producers from the same locality, even in scenarios of NRF forwarding and empty-list functionality being enabled. The subject matter described herein allows NF consumers to choose local NF producers with low network latency. The network operator can configure policies for processing an NF discovery response with an OC-empty-list-applied header, including on a per-NF-type basis, including applying different policies for different NF types. For example, if the type of NF identified in the NF profiles of an NF discovery response is UDM, the forwarding NRF may apply policy2. If the NF type of the NF profiles identified in the NF discovery response is PCF, the forwarding NRF may apply policy3.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.4.0 (2023-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network function (NF) discovery between forwarded and forwarding NF repository functions (NRFs), the method comprising:
   receiving, at a forwarding NRF, an NF discovery request message generated by a consumer NF or a service communication proxy (SCP);
   determining, by the forwarding NRF, not to process the NF discovery request message locally at the forwarding NRF and transmitting the NF discovery request message to a forwarded NRF;
   receiving, at the forwarded NRF, the NF discovery request message, and locating NF profiles of producer NFs having attributes that match query parameters in the NF discovery request message;
   determining, by the forwarded NRF, that all of the NF profiles of the producer NFs having attributes that match the query parameters in the NF discovery request message indicate that the producer NFs are in a SUSPENDED state;
   in response to determining that the NF profiles indicate that the producer NFs are in the SUSPENDED state, applying, by the forwarded NRF, empty-list functionality to promote the producer NFs to a REGISTERED state;
   generating and transmitting, by the forwarded NRF, an NF discovery response message including the NF profiles of the producer NFs promoted to the REGISTERED state, and communicating, to the forwarding NRF, an indication of the application of the empty-list functionality;
   at the forwarding NRF, receiving the NF discovery response message and the indication of the application of the empty-list functionality, and applying a policy to process the indication of the application of the empty-list functionality; and
   transmitting, by the forwarding NRF, the NF discovery response message to the consumer NF or SCP that generated the NF discovery request message.

2. The method of claim 1 wherein determining not to process the NF discovery request message locally includes determining that producer NFs local to the forwarding NRF with NF profiles having attributes that match the query parameters in the NF discovery request message are in a SUSPENDED state.

3. The method of claim 1 wherein applying the empty-list functionality includes applying the empty-list functionality on a per-NF-type basis.

4. The method of claim 1 wherein communicating the indication of the application of the empty-list functionality to the forwarding NRF includes adding a header to the NF discovery response message that indicates that the empty-list functionality was applied.

5. The method of claim 1 wherein applying the policy includes ignoring the indication of the application of the empty-list functionality.

6. The method of claim 1 wherein applying the policy includes applying empty-list functionality at the forwarding NRF to promote producer NFs local to the forwarding NRF with NF profiles having attributes that match query parameters in the NF discovery request message from the SUSPENDED state to the REGISTERED state.

7. The method of claim 6 wherein applying the policy includes replacing the NF profiles of the producer NFs included in the NF discovery response message by the forwarded NRF with NF profiles of the producer NFs local to the forwarding NRF having attributes that match the query parameters in the NF discovery request message.

8. The method of claim 6 wherein applying the policy includes adding, by the forwarded NRF and to the NF discovery response message, the NF profiles of the producer NFs local to the forwarding NRF having attributes that match the query parameters in the NF discovery request message.

9. The method of claim 8 wherein applying the policy includes prioritizing the NF profiles of the producer NFs local to the forwarding NRF having attributes that match the query parameters in the NF discovery request message over the NF profiles of the producer NFs included in the NF discovery response message by the forwarded NRF.

10. The method of claim 1 wherein applying the policy includes applying the policy on a per-NF-type basis.

11. A system for network function (NF) discovery between forwarded and forwarding NF repository functions (NRFs), the system comprising:
- a first NRF including at least one processor and functioning as a forwarding NRF; and
- a second NRF including at least one processor and functioning as a forwarded NRF, wherein:
- the forwarding NRF is configured to receive an NF discovery request message generated by a consumer NF or a service communication proxy (SCP), determine not to process the NF discovery request message locally at the forwarding NRF, and transmit the NF discovery request message to the forwarded NRF;
- the forwarded NRF is configured to receive the NF discovery request message, locate NF profiles of producer NFs having attributes that match query parameters in the NF discovery request message, determine that all of the NF profiles of the producer NFs having attributes that match the query parameters in the NF discovery request message indicate that the producer NFs are in a SUSPENDED state, in response to determining that the NF profiles indicate that the producer NFs are in the SUSPENDED state, apply empty-list functionality to promote the producer NFs to a REGISTERED state, and generate and transmit an NF discovery response message including the NF profiles of the producer NFs promoted to the REGISTERED state, and communicate, to the forwarding NRF, an indication of the application of the empty-list functionality; and
- the forwarding NRF is configured to receive the NF discovery response message and the indication of the application of the empty-list functionality, apply a policy to process the indication of the application of the empty-list functionality, and transmit the NF discovery response message to the consumer NF or SCP that generated the NF discovery request message.

12. The system of claim 11 wherein, in determining not to process the NF discovery request message locally, the forwarding NRF is configured to determine that producer NFs local to the forwarding NRF with NF profiles having attributes that match the query parameters in the NF discovery request message are in a SUSPENDED state.

13. The system of claim 11 wherein the forwarded NRF is configured to apply the empty-list functionality on a per-NF-type basis.

14. The system of claim 11 wherein the forwarded NRF is configured to communicate the indication of the application of the empty-list functionality to the forwarding NRF by adding a header to the NF discovery response message that indicates that the empty-list functionality was applied.

15. The system of claim 11 wherein, in applying the policy, the forwarding NRF is configured to ignore the indication of the application of the empty-list functionality.

16. The system of claim 11 wherein, in applying the policy, the forwarding NRF is configured to apply empty-list functionality to promote producer NFs local to the forwarding NRF with NF profiles having attributes that match query parameters in the NF discovery request message from the SUSPENDED state to the REGISTERED state.

17. The system of claim 16 wherein, in applying the policy, the forwarding NRF is configured to replace the NF profiles of the producer NFs included in the NF discovery response message by the forwarded NRF with NF profiles of the producer NFs local to the forwarding NRF having attributes that match the query parameters in the NF discovery request message.

18. The system of claim 16 wherein, in applying the policy, the forwarding NRF is configured to add, to the NF discovery response message, the NF profiles of the producer NFs local to the forwarding NRF having attributes that match the query parameters in the NF discovery request message and prioritize the NF profiles of the producer NFs local to the forwarding NRF having attributes that match the query parameters in the NF discovery request message over the NF profiles of the producer NFs included in the NF discovery response message by the forwarded NRF.

19. The system of claim 11 wherein the forwarding NRF is configured to apply the policy on a per-NF-type basis.

20. One or more non-transitory computer readable media having stored thereon executable instructions that when executed by processors of one or more computers control the one or more computers to perform steps comprising:
- receiving, at a forwarding network function (NF) repository function (NRF), an NF discovery request message generated by a consumer NF or a service communication proxy (SCP);
- determining, by the forwarding NRF, not to process the NF discovery request message locally at the forwarding NRF and transmitting the NF discovery request message to a forwarded NRF;
- receiving, at the forwarded NRF, the NF discovery request message, and locating NF profiles of producer NFs having attributes that match query parameters in the NF discovery request message;
- determining, by the forwarded NRF, that all of the NF profiles of the producer NFs having attributes that match the query parameters in the NF discovery request message indicate that the producer NFs are in a SUSPENDED state;
- in response to determining that the NF profiles indicate that the producer NFs are in the SUSPENDED state, applying, by the forwarded NRF, empty-list functionality to promote the producer NFs to a REGISTERED state;
- generating and transmitting, by the forwarded NRF, an NF discovery response message including the NF profiles of the producer NFs promoted to the REGISTERED state, and communicating, to the forwarding NRF, an indication of the application of the empty-list functionality;
- at the forwarding NRF, receiving the NF discovery response message and the indication of the application of the empty-list functionality, and applying a policy to process the indication of the application of the empty-list functionality; and
- transmitting, by the forwarding NRF, the NF discovery response message to the consumer NF or SCP that generated the NF discovery request message.

* * * * *